(12) United States Patent
Baril et al.

(10) Patent No.: US 8,872,825 B2
(45) Date of Patent: Oct. 28, 2014

(54) METHOD OF REPRESENTING A MATERIAL

(75) Inventors: Jérôme Baril, Martignas (FR); Patrick Gioia, Servon sur Vilaine (FR)

(73) Assignee: Orange, Paris (FR)

( * ) Notice: Subject to any disclaimer, the term of this patent is extended or adjusted under 35 U.S.C. 154(b) by 494 days.

(21) Appl. No.: 13/144,547

(22) PCT Filed: Jan. 25, 2010

(86) PCT No.: PCT/FR2010/050103
§ 371 (c)(1),
(2), (4) Date: Jul. 14, 2011

(87) PCT Pub. No.: WO2010/086541
PCT Pub. Date: Aug. 5, 2010

(65) Prior Publication Data
US 2011/0273450 A1 Nov. 10, 2011

(30) Foreign Application Priority Data
Jan. 28, 2009 (FR) ...................................... 09 50522

(51) Int. Cl.
G06T 15/00 (2011.01)
G06T 11/00 (2006.01)
G06T 15/04 (2011.01)

(52) U.S. Cl.
CPC .............. G06T 11/001 (2013.01); G06T 15/04 (2013.01)
USPC ............................ 345/426; 345/419; 345/582

(58) Field of Classification Search
CPC ..................................................... G06T 15/04
USPC ......................................... 345/419, 426, 582
See application file for complete search history.

(56) References Cited

U.S. PATENT DOCUMENTS
8,350,855 B2 * 1/2013 Van Horn et al. ............. 345/426

FOREIGN PATENT DOCUMENTS
WO WO 2008/110719 A1 9/2008

OTHER PUBLICATIONS

Kiselman, Approximation by Polynomials, Sep. 7, 1999, pp. 1-40.*
Song, Wavelet Image Compression, 1991, pp. 1-33.*
Baril et al., "Polynomial Wavelet Trees for Bidirectional Texture Functions," International Conference on Computer Graphics and Interactive Techniques ACM SIGGRAPH 2008 Talks, p. 1 (Aug. 11-15, 2008).
Malzbender et al., "Polynomial Texture Maps," Computer Graphics, SIGGRAPH 2001, Conference Proceedings, Los Angeles, CA, Aug. 12-17, 2001, New York, NY, ACM, US, pp. 519-528 (Aug. 12, 2001).
Suykens et al., "Interactive Rendering with Bidirectional Texture Functions," Computer Graphics Forum, Blackwell Publishing, vol. 22(3), pp. 463-472 (Sep. 2003).

* cited by examiner

*Primary Examiner* — Phu K Nguyen
(74) *Attorney, Agent, or Firm* — Drinker Biddle & Reath LLP

(57) ABSTRACT

A method is provided for representing a material by approximating an original function modeling the interaction of the material and of light emitted by a light source, which function is defined as a function of pixels, of viewpoints, and of light directions, the method comprising: for each viewpoint, the steps of performing a polynomial approximation of the original modeling function and a geometric approximation of a residue resulting from the difference between the original modeling function and the polynomial approximation of said function; and a step of simplification by decomposing the results obtained from the two approximations into wavelet packets.

12 Claims, 3 Drawing Sheets

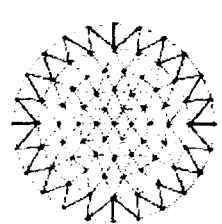
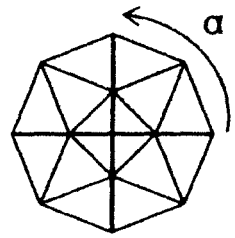
Fig. 2a  Fig. 2b
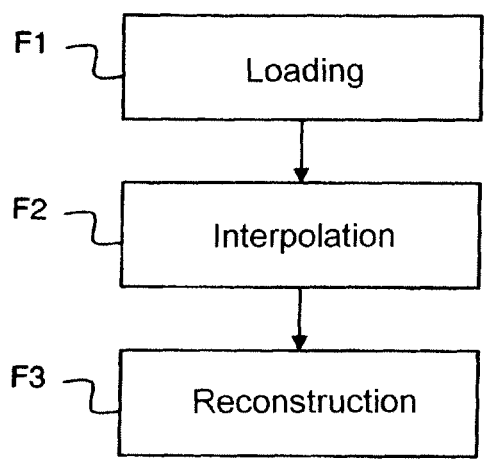
Fig. 3

METHOD OF REPRESENTING A MATERIAL

CROSS-REFERENCE TO RELATED APPLICATIONS

This application is the U.S. national phase of the International Patent Application No. PCT/FR2010/050103 filed Jan. 25, 2010, which claims the benefit of French Application No. 09 50522 filed Jan. 28, 2009, the entire content of which is incorporated herein by reference.

FIELD OF THE INVENTION

The present invention lies in the field of graphics computing, more particularly in the field of representing and rendering materials in a virtual environment.

BACKGROUND

The invention relates to a method of representing a material and to a corresponding rendering method.

The invention may be used in virtual navigation applications, in videogames, in animated films, etc.

Such applications include real-time rendering of virtual scenes in which real articles are represented by virtual articles.

In order to obtain a realistic rendering, the representation of an article requires not only a geometrical representation of the article (shape, size, etc.), but also a representation of the appearance of that article, and in particular of the interaction between the article and a light source.

This interaction depends on the material constituting the article. For example, for a translucent material such as skin, a light ray is reflected in part on the surface of the material, and it is absorbed in part. In another example, a material may have geometrical special features (relief, roughness, etc.) that disturb the path of light.

Functions exist for modeling the interaction between a light source and a material.

Thus, bidirectional reflectance distribution functions (BRDFs) represent the light energy reflected at the surface of a material. These functions are expressed relative to light directions and relative to viewpoints.

Certain materials, for example a metal surface, may be represented by a BRDF function. Such a representation is not possible for a complex material having a surface that is not uniform, for example a surface that is granular or a surface that presents variations in color, etc.

Spatially-varying bidirectional reflectance distribution functions (SVBRDFs) or bidirectional texture functions (BTFs) are then used, which are expressed relative to light directions and to viewpoints, and also relative to the surface of the material. BTF functions make it possible to represent materials having a surface that can give rise to parallax effects, whereas SVBRDF functions are suitable only for representing materials having a surface that is practically plane.

BTF functions are constituted by a dataset, also known as a "texture", and they have six dimensions. The data is obtained from a set of images of the material in which each image is associated with a light direction and with a viewpoint. The six dimensions correspond to the spatial coordinates of the pixels of an image, which coordinates are equivalent to the points at the surface of the material, to the polar coordinates of the light directions, and to the polar coordinates of the viewpoints.

Once acquired, this data is transformed, and in particular it is compressed in order to obtain a function that is compact, i.e. of small size, for reasons of storage space, and in order to enable rendering to take place quickly on graphics hardware. One of the difficulties to be solved during compression is to obtain a compact function that is as close as possible to the original function derived from acquiring the data, thereby limiting the error that is due to the compression.

Numerous techniques exist for compressing BTF functions, including parametric approximation techniques.

Thus, in an article entitled "Polynomial Texture Map" published in SIGGRAPH '01: Proceedings of the $28^{th}$ annual conference on computer graphics and interactive techniques, pp 519-528, New York, N.Y., USA, 2001, Tom Malzbender et al. describe a parametric approximation technique for a BTF function in which the approximation is performed by a set of polynomials. For a fixed viewpoint, specifically the front viewpoint, a polynomial is defined for each pixel depending on the directional variations of light.

Each pixel or point on the surface of the material receives light from a set of directions. A direction corresponds to an axis passing through the point in question and a point on the surface of a hemisphere having its base resting on the material. The directions of light belong to a space having three dimensions. The technique of Tom Malzbender et al. consists in projecting the directions of the light into a two-dimensional space and in approximating the resulting surface by polynomials. The projection used is an orthogonal projection.

That technique presents a drawback of being defined for a single determined viewpoint, namely the front viewpoint. Representing a material from a single viewpoint is not sufficient for use in a dynamic photo-realistic environment.

In the paper entitled "Preserving realism in real-time rendering of bidirectional texture functions" published in the context of the OpenSG Symposium 2003, pp 89-96, Eurographics Association, Switzerland, April 2003, J. Meseth et al. apply the above technique to each viewpoint of the set of visible viewpoints. Unfortunately, the effects induced by varying the direction of the light are not uniform with viewpoint. For example, a material may tend to become more specular, i.e. it may reflect more light, for directions in which the light is grazing. Consequently, it is not appropriate to use the same type of projection from one viewpoint to another.

That technique presents another drawback, relating to the size of the dataset, which size increases linearly with the number of viewpoints.

SUMMARY

One of the objects of the invention is to remedy the drawbacks of the above-mentioned prior art.

Thus, in a first aspect, the present invention provides a representation method for representing a material of an article by approximating an original function modeling the interaction of the material and of light emitted by a light source, which function is defined as a function of pixels, of viewpoints, and of light directions, which representation method comprises:
 for each viewpoint, the steps of performing a polynomial approximation of the original modeling function and a geometric approximation of a residue resulting from the difference between the original modeling function and the polynomial approximation of said function; and
 a step of simplification by decomposing the results obtained from the two approximations into wavelet packets.

Thus, the method of the invention for representing a material takes account of each viewpoint.

The polynomial approximation of the original modeling function makes it possible to represent the original modeling function by a set of polynomial textures of size smaller than the size of the original dataset.

The geometric approximation of the residue reduces the approximation errors induced by the polynomial approximation and makes it possible to obtain a representation that is richer and closer to the original function.

The simplification serves to eliminate the redundancies of the polynomial approximation of the original modeling function and of the geometric approximation of the residue, and thus to obtain greater compression of the original modeling function.

According to a preferred characteristic, the original modeling function is a BTF function or an SVBRDF function.

The method is thus adapted to BTF functions and to SVBRDF functions.

According to a preferred characteristic, the polynomial approximation step of the original modeling function is performed from an original mesh resulting from a paraboloidal projection of a three-dimensional space into a two-dimensional space of median vectors obtained from a vector representative of the viewpoint direction and from vectors representative respectively of each of the light directions.

A paraboloidal projection improves the qualitative results of the polynomial approximation of the original modeling function for a given viewpoint, in particular when the light is grazing.

The projection of a median vector makes it possible to generalize the projection of the space of light directions to the set of viewpoints and thus to further improve the qualitative results of the polynomial approximation of the original modeling function.

According to a preferred characteristic, the step of geometrically approximating the residue is performed from an approximation mesh resulting from a paraboloidal projection of a three-dimensional space into a two-dimensional space of median vectors obtained from a vector representative of the viewpoint direction and from vectors representative respectively of directions selected from the light directions.

The use of an approximation mesh selected from directions among the light directions, serves to minimize errors in the polynomial approximation.

According to a preferred characteristic, the step of simplification by decomposing the polynomial approximation of the original modeling function and the geometric approximation of the residue into wavelet packets includes obtaining subbands made up of approximation coefficients and of detail coefficients.

This step makes it possible to project the representation that is obtained of the original modeling function into an analysis space, thereby making it easier to identify redundant information.

According to a preferred characteristic, by applying a simplification criterion, subbands are selected from the subbands obtained and, when a subband is selected, a presence map is updated.

It is thus possible to sort the set of subbands depending on their contribution to the representation, and to eliminate information of lesser importance by applying a selected criterion. The presence map serves to identify the information that is retained for the representation and also the information that is not retained.

The invention also provides a method of rendering a representation of a material of an article obtained by approximating an original function modeling the interaction of the material and of light emitted by a light source, which function is defined as a function of pixels, of viewpoints, and of light directions, which rendering method comprises:

a reconstruction step comprising reconstituting a polynomial approximation of the original modeling function and reconstituting a geometric approximation of a residue resulting from the difference between the original modeling function and the polynomial approximation of said function.

Thus, the rendering method of the invention enables rendering to be performed in real time directly on graphics equipment in order to obtain levels of performance that are high (in images per second).

Furthermore, the rendering method is performed in full on the graphics equipment, thereby releasing the software resources of conventional processors for other processes in a complex virtual environment.

The invention also provides a device for representing a material of an article by approximating an original function modeling the interaction of the material and of light emitted by a light source, which function is defined as a function of pixels, of viewpoints, and of light directions, which representation device comprises:

a factorization module performing, for each viewpoint, a polynomial approximation of the original modeling function and a geometric approximation of a residue resulting from the difference between the original modeling function and the polynomial approximation of said function; and a simplification module for simplifying the results obtained at the output from the factorization module.

The invention also provides a rendering device for rendering a representation of a material of an article obtained by approximating an original function modeling the interaction of the material and of light emitted by a light source, which function is defined as a function of pixels, of viewpoints, and of light directions, the device being characterized in that it comprises:

reconstruction means for reconstituting a polynomial approximation of the original modeling function and for reconstituting a geometric approximation of a residue resulting from the difference between the original modeling function and the polynomial approximation of said function.

The invention also provides a computer program including instructions for executing the steps of a method as described above for representing a material of an article by approximating an original function modeling the interaction of the material and of light emitted by a light source, which function is defined as a function of pixels, of viewpoints, and of light directions, when the program is executed on a computer.

The invention also provides a computer program including instructions for executing the steps of a method as described above for rendering a representation of a material of an article obtained by approximating an original function modeling the interaction of the material and of light emitted by a light source, which function is defined as a function of pixels, of viewpoints, and of light directions, when the program is executed on a computer.

The invention also provides a graphics terminal including a rendering device as described above.

BRIEF DESCRIPTION OF THE DRAWINGS

The invention can be better understood in the light of the following description of a particular implementation of a method of the invention for representing a material and a method of the invention for rendering a material, the description being given with reference to the accompanying drawings, in which:

FIGS. 2a and 2b show respectively an original mesh and an approximation mesh;

FIG. 3 is a flow chart of a method of the invention for rendering a material.

DETAILED DESCRIPTION

The invention relates to a method of representing a material by approximating a function for modeling the interaction between the material under consideration and the light emitted by a light source.

The modeling function is a BTF function or an SVBRDF function.

Various transformations are applied to the original modeling function in order to obtain a representation of the material under consideration that is more compact, while conserving a good level of realism.

The invention also relates to a method of real-time rendering on the graphics equipment from a representation of a material as obtained by the above method.

The representation of a material, as obtained by applying the above-mentioned method of representing a material, may be loaded into graphics equipment. By applying thereto a rendering method as defined by the invention, real-time rendering is thus obtained for the material under consideration.

Figure 1:
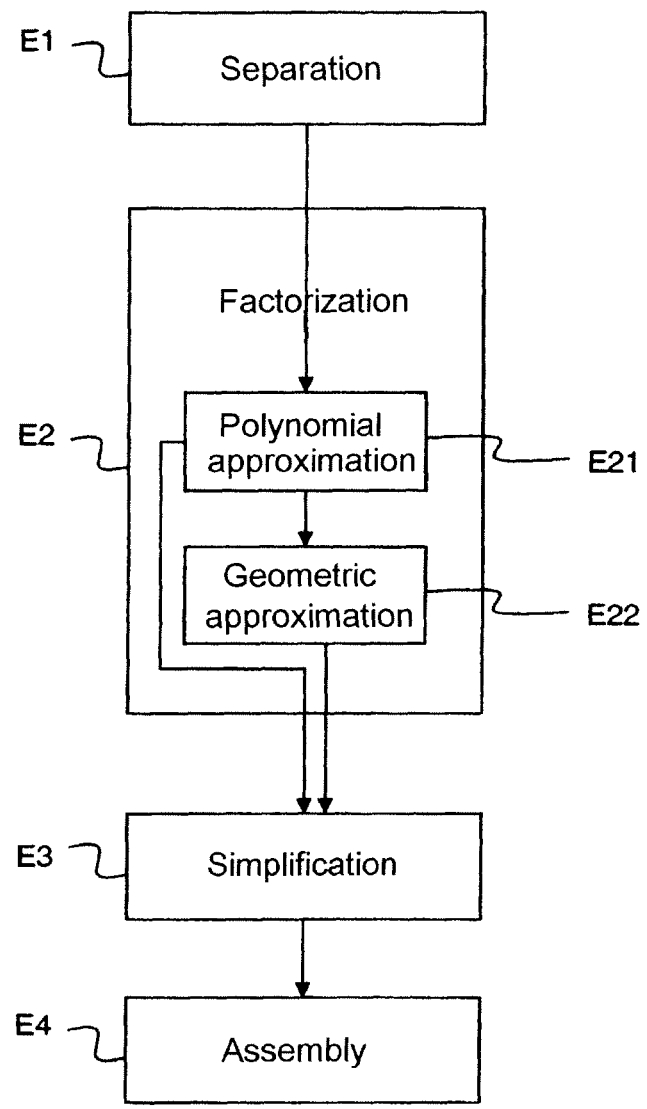
FIG. 1 is a flow chart of a method of the invention for representing a material.

FIG. 1 is a flow chart of a method of the invention for rendering a material.

In a particular implementation of the invention, the interaction between a light source and the material under consideration is modeled by a BTF function that may be referred to as the "original" BTF function.

This original BTF function is made up of textures, or of a dataset, obtained from a set of images of the material. Each image is associated with a light direction and a viewpoint.

By way of non-limiting example, the invention has been implemented for 81 light directions and 81 viewpoints.

This original BTF function is a six-dimensional function that is expressed as follows:

$$BTF(x,y,\theta_v,\phi_v,\theta_l,\phi_l)$$

where:
(x,y) are the coordinates of a pixel of an image and correspond to the spatial coordinates of a point on the surface of the material;
($\theta_v,\phi_v$) are the polar coordinates of a viewpoint $\underline{v}$; and
($\theta_l,\phi_l$) are the polar coordinates of a light direction l.

The method of the invention for representing a material comprises a set of steps during which various transformations are applied to the original BTF function, written BTF (x,y,$\theta_v$, $\phi_v,\theta_l,\phi_l$) in order to obtain a compact BTF function, written:

$$\tilde{BTF}(x,y,\theta_v,\phi_v,\theta_l,\phi_l)$$

The method of the invention has several targets including that of obtaining a compact BTF function of a size that is greatly reduced, while being as close as possible to the original BTF function.

Below, the method makes use of soft transitions of the light direction space, i.e. for two neighboring directions of light, the two corresponding images have differences that are small. The method also makes use of spatial coherence, i.e. similarity between pairs of adjacent pixels.

The method as shown in FIG. 1 includes a first step E1 of separation.

During this step, the textures constituting the original BTF function are separated depending on different viewpoints.

This separation makes it possible to avoid any parallax effect induced by a change of viewpoint. There is a parallax effect when certain portions of the surface of the material may be hidden when looking at it from one viewpoint and not hidden when looking at it from another viewpoint.

At the end of step E1, a BTF function is obtained for a given viewpoint that is written $BTF_v$.

This function is constituted by textures that, for a given viewpoint, correspond to the set of light directions and to all of the pixels or points. Thus:

$$BTF_v(x,y,\theta_l,\phi_l)$$

where:
$\underline{v}$ is a given viewpoint;
and as before:
(x,y) are the coordinates of a pixel of an image and correspond to the spatial coordinates of a point on the surface of the material; and
($\theta_l,\phi_l$) are the polar coordinates of a light direction l.

The original BTF function is then expressed in the form:

$$BTF(x,y,\theta_v,\phi_v,\theta_l,\phi_l)=\{BTF_v(x,y,\theta_l,\phi_l)\}, \forall v$$

Thereafter the method is performed per viewpoint (i.e. for each viewpoint), with each viewpoint being taken separately.

The method includes a factorization step E2.

This factorization step E2 comprises approximating the textures obtained during the separation step E1 for a given viewpoint, i.e. approximating the per viewpoint BTF function, written $BTF_v$.

This factorization step E2 serves to reduce the size of the set of textures of the function $BTF_v$ in order to have a compact BTF function, i.e. of a format that is reduced and easier to use.

Step E2 includes two substeps E21 and E22.

The substep E21 corresponds to approximation of the function $BTF_v$ under consideration.

During the substep E22, it is sought to reduce the error that results from the preceding approximation so that the result of factorization step E2 is as close as possible to the textures obtained at the end of separation step E1.

In order to perform the approximation of step E21, a polynomial approximation technique is used that is similar to the above-described approximation technique of Tom Malzbender et al.

Biquadratic polynomials are used per pixel (i.e. for each pixel) to formalize analytically the interactions that depend on light directions for a given viewpoint.

These polynomials are defined in such a manner that for a pixel p and a viewpoint v, the following applies:

$$BTF_{p,v}(\theta_l,\phi_l) \gg Q_{p,v}(\pi(\theta_l,\phi_l))$$

$$Q_{p,v}\left(\prod(\theta_l,\varphi_l)\right) = \sum_{z,t} a_{z,t} l_x^z l_y^t$$

where:
$BT_{p,v}(\theta_l,\phi_l)$ is the BTF function being approximated. It is made up of textures corresponding to the set of light directions for a given pixel $\underline{p}$ and viewpoint $\underline{v}$;

($\theta_l,\phi_l$) are the polar coordinates of a light direction l;
$Q_{p,v}$ is the polynomial that results from the approximation. $Q_{p,v}$ is defined by the paraboloidal projection π of the light direction l of a three-dimensional space onto a two-dimensional space ($l_x,l_y$);
z and t vary depending on the degree of the polynomial, here a biquadratic polynomial, so z,t∈[0; 2]; and
the coefficients $a_{z,t}$ are the coefficients of the polynomial $Q_{p,v}$.

The projection function π is such that:

$$\pi(\theta_l,\phi_l)=(l_x,l_y)$$

where:
($\theta_l,\phi_l$) are the polar coordinates of the light direction l; and
($l_x,l_y$) are the spatial coordinates of the projection of the light direction l into the two-dimensional projection space.

Unlike the above-described approximation technique of Tom Malzbender et al., the projection function π of the invention is not an orthogonal projection function but is a paraboloidal projection function.

The method of the invention uses a paraboloidal projection function as defined by Wolfgang Heidrich and Hans-Peter Seidel in "View-independent environment maps—HWWS '98", pp. 39 et seq., New York, N.Y., USA, 1998, ACM.

The choice of a paraboloidal projection function presents the advantage of improving the results of the approximation, in particular when the light is grazing.

The method of the invention also differs from the approximation technique of Tom Malzbender et al. in other aspects.

One of these aspects relates to the direction of the projected light.

In the technique of Tom Malzbender et al., it is the light direction vector that is projected, whereas in the method of the invention it is a vector $\vec{H}$ that is projected. This vector $\vec{H}$ is a median vector between the vector $\vec{V}$ representative of the direction of the viewpoint and the vector $\vec{L}$ representative of the light direction, i.e.:

$$\vec{H} = \frac{\vec{V}+\vec{L}}{\|\vec{V}+\vec{L}\|}$$

where:
$\vec{V}$ is the vector representative of the direction of the viewpoint passing through the given pixel p and the given viewpoint v;
$\vec{L}$ is the vector representative of the direction of light passing via the given pixel p and a point from which the light ray under consideration comes; and
∥ ∥ is the "norm" operator for measuring the length of a vector.

The polynomial approximation makes it possible to reduce the size of the set of textures of the BTF function to which it is applied. As its name indicates, it is an approximation, and consequently it does not make it possible to conserve all of the features of the BTF function. For example, effects of specularity and certain shading effects are represented poorly or not at all by a polynomial approximation. Specularity corresponds to circumstances in which the reflection of the light at a point is greater for one light direction than for the other directions over which it is more or less constant. The effects of shading are effects associated with the shape of the material.

These losses associated with the approximation, also referred to as the "residue" are defined as follows:

$$R_{p,v}(\theta_l,\phi_l)=BTF_{p,v}(\theta_l,\phi_l)-Q_{p,v}(\pi(\theta_l,\phi_l)).$$

where $R_{p,v}(\theta_l,\phi_l)$ is the residue (at a given pixel p, for a given viewpoint v, for all light directions l of polar coordinates ($\theta_l,\phi_l$) of the polynomial approximation of the function $BTF_{p,v}(\theta_l,\phi_l)$ defined for the same parameters. This is thus the difference between the BTF function before approximation, i.e. $BTF_{p,v}(\theta_l,\phi_l)$ and the polynomial $Q_{p,v}(\pi(\theta_l,\phi_l))$ resulting from the approximation.

The following substep E22 of the method of the invention is a geometrical approximation step in which the residue is approximated geometrically.

One of the purposes of the step E22 is to minimize errors associated with the polynomial approximation of the preceding step E21 and represented by the residue. This step serves to enrich the polynomial approximation by treating certain light directions that are represented poorly or not at all (specularity, shading, etc.) by the polynomial approximation and that contribute to the realism of the representation of the material.

These light directions that generate a large residue differ from one pixel to another.

In order to reduce the size of the data, it is not possible to work with all light directions. For the same reason, it is not possible to work on light directions that generate a residue for each of the pixels since that would amount more or less to working with all light directions. It is therefore appropriate to work on a predefined number of light directions that are common for all of the pixels. In the implementation of the invention mentioned above, the number of light directions is 81. The predefined number of light directions that are worked on is equal to 13.

In order to minimize errors associated with the polynomial approximation of step E21, a geometrical approximation is made of the residue by means of an approximation mesh.

The residue may be interpreted geometrically by a space having 2.5 dimensions, also referred to as an elevation surface. This space of 2.5 dimensions corresponds to a two-dimensional mesh (obtained after R paraboloidal projection of the three-dimensional space formed by the light directions triangulated towards a two-dimensional space) provided with an elevation at each point representing the residue.

The term "original mesh" is used to designate the mesh corresponding to projecting all of the light directions (81 in the implementation described). The term "approximation mesh" is used to designate the mesh corresponding to projecting the selected light directions (13 in this implementation described).

FIGS. 2a and 2b show respectively an original mesh and an approximation mesh.

The intermediate points between the original mesh and the approximation mesh and corresponding to the light directions that are not worked on are calculated by barycentric interpolation.

The light directions selected to define the approximation mesh are such that the resulting approximation mesh is geometrically more representative of the original mesh in two dimensions. These light directions do not necessarily correspond to the greatest residue for a given pixel. To take into account this aspect, a parameter α is introduced, as shown in FIG. 2b, that corresponds to an angle of rotation of the approximation mesh around its center, such that:

$$\alpha \in \left[0; \frac{\pi}{2}\right[.$$

This rotation serves to cause the approximation mesh to coincide better with the light directions for which the residue is great and apparent in the original mesh. The geometrical approximation of the residue by means of the approximation mesh amounts to identifying the angle of rotation α for which the error between the original mesh and the approximation mesh is minimized in the least-squares sense.

Uniform zones of a material present great spatial coherence (a large amount of similarity between pairs of adjacent pixels), which means that the angles of rotation α for two adjacent pixels ought to be close. Too great a difference between the angles of rotation α as calculated for two adjacent pixels gives rise to large visual differences. These visual differences are due to the undersampling of the approximation mesh compared with the original mesh.

In order to take account of the similarity between neighboring pixels, the angle of rotation is calculated for a given pixel by constrained multi-resolution analysis.

Multi-resolution analysis involves defining the residue for several levels of resolution. Since the residue can be thought of as a texture (dataset), a conventional wavelet decomposition is used to define the residue for the different levels of resolution. This type of decomposition is dyadic, i.e. the size of the texture from one level of resolution to another varies by a factor of 2.

The constraint is introduced in calculating the angle of rotation. To calculate the angle of rotation at a given level of resolution, account is taken of the angle of rotation obtained at the preceding level of resolution.

There follows a description of the calculation of the angle of rotation by constrained multi-resolution analysis for $\underline{n}$ levels of resolution, the level 0 being the coarsest level of resolution and the level $\underline{n}$ being the finest level of resolution.

It should be recalled that $R_{p,v}(\theta_l,\phi_l)$ is the residue at a given pixel $\underline{p}$ for a given viewpoint $\underline{v}$ for all light directions l having polar coordinates $(\theta_l,\phi_l)$ obtained at the end of step E21 for approximating the function $BTF_v$.

At resolution level $\underline{r}$, such that $0 \le r \le n$, $R_{p,v}^r(\theta_l,\phi_l)$ is the residue obtained at a given pixel $\underline{p}$ for a given viewpoint $\underline{v}$ for all light directions l of polar coordinates $(\theta_l,\phi_l)$.

The geometrical approximation to the residue $R_{p,v}^r(\theta_l,\phi_l)$ at resolution level $\underline{r}$ is written:

$$\tilde{R}_{p,v}^r(\theta_l,\phi_l,\alpha_p^r)$$

The constrained multi-resolution analysis begins at the coarsest level of resolution, i.e. level 0.

The set of $\alpha_p^0$ is calculated so as to minimize the quadratic error between the residue $R_{p,v}^0$ and the geometrical approximation to the residue $\tilde{R}_{p,v}^0$. The set of the $\alpha_p^0$ is calculated in such a manner as to obtain:

$$(R_{p,v}^0(\theta_l,\phi_l) - \tilde{R}_{p,v}^0(\theta_l,\phi_l,\alpha_p^0))^2 = 0$$

The analysis continues towards the higher level. Thus, at resolution level $\underline{r}$, such that $0 \le r \le n$, it is sought to obtain:

$$(R_{p,v}^r(\theta_l,\phi_l) - \tilde{R}_{p,v}^r(\theta_l,\phi_l,\alpha_p^r))^2 = 0.$$

with:

$$\alpha_p^{r-1} - c^r \le \alpha_p^r \le \alpha_p^{r-1} + c^r$$

where $c^r$ is a constraint defined for each level $r = 1, \ldots, \underline{n}$ relative to $c^0$ such that:

$$c^0 = \frac{c^1}{2} = \ldots = \frac{c^{n-1}}{2^{n-1}} = \frac{c^n}{2^n}$$

and $$c^0 \in \left[0; \frac{\pi}{4}\right[.$$

Initializing $c^0$ serves to constrain the system to a greater or lesser extent. The greater $c^0$, the less the system is constrained.

At the end of the analysis, each pixel $\underline{p}$ corresponds to an angle of rotation $\alpha_p$ associated with the approximation mesh of the residue and a geometric approximation of the residue that is written:

$$\tilde{R}_{p,v}(\theta_l,\phi_l,\alpha_p).$$

Steps E21 and E22 are performed for each of the pixels taken separately. Thereafter the results of these two steps are united for all of the pixels.

With reference to FIG. 1, at the end of factorization step E2, a polynomial approximation of the original BTF function is available together with a geometric approximation of the corresponding residue, for a given viewpoint, for the set of light directions, and for all of the pixels.

The polynomial approximation of the original BTF function serves to reduce the size of the texture (or dataset) of said function in significant manner (by a factor of about 10). The approximation of the residue enables data to be obtained that is close to the original data so as to ensure a realistic representation of the material.

The following step E3 in a method of the invention for representing a material is a simplification step.

One of the purposes of this step is to reduce the quantity of data from the factorization step E2 by keeping only the data that is essential for a realistic representation of the material under consideration.

To do this, use is made of the redundancies present in the BTF function after factorization. These redundancies correspond in particular to the similarities that may exist between one pixel and its neighbors.

To perform simplification step E3, a technique of decomposition into wavelet packets is used.

In general, a decomposition into wavelet packets serves to project a dataset into an analysis space that is appropriate for extracting the most meaningful elements.

Specifically, the application of the technique of decomposition into wavelet packets for implementing the simplification step leads to consideration being given to data from the factorization via two datasets.

A first dataset contains the coefficients of polynomials obtained at step E21 and representing the polynomial approximation of the per viewpoint BTF function written $BTF_v$. There are six coefficients per pixel.

A second dataset contains the elevations of the approximation meshes and the associated angles of rotation obtained in step E22 and representing the geometric approximation of the residue. There are fourteen coefficients per pixel.

Decomposition into wavelet packets is performed on these two datasets.

The application of the technique of decomposition into wavelet packets consists in decomposing the data under consideration into subbands.

Each subband contains a set of wavelet coefficients.

For an image, a wavelet coefficient comprises space and frequency information that represents the difference between a pixel and its neighbors.

Two types of wavelet coefficient can be distinguished: approximation coefficients and detail coefficients.

Approximation coefficients define an image at a given level of resolution, lower than the original level of resolution.

Detail coefficients represent the difference between two levels of resolution. Detail coefficients serve to pass from one level of resolution to a higher level of resolution, with passage taking place from the finest level of resolution to the coarsest level of resolution.

A detail coefficient is zero if two adjacent pixels are identical.

Each of the two above-identified datasets is subdivided into subbands where:

i represents the decomposition level; and j represents the index of a subband and varies over the range 0 to $4^i$.

For each subband, the wavelet coefficients are defined by two energy functions $E_Q$ and $E_{\tilde{R}}$, respectively for the polynomial approximation Q and for the geometric approximation of the residue $\tilde{R}$.

The energy function is the sum of the squares of the wavelet coefficients generated by one of the approximations (polynomial approximation or geometric approximation) for the set of light directions and for a given viewpoint.

The two energy functions $E_Q$ and $E_{\tilde{R}}$ are defined as follows:

$$E_Q(\Omega_j^i) = \sum_{(x,y) \in Q_j^i} \left( \sum_{(\theta_l, \varphi_l)} Q^2(x, y, \pi(\theta_l, \varphi_l)) \right)$$

and $$E_{\tilde{R}}(\Omega_j^i) = \sum_{(x,y) \in \Omega_j^i} \left( \sum_{(\theta_l, \varphi_l)} \tilde{R}^2(x, y, \pi(\theta_l, \varphi_l)) \right)$$

with $$E(\Omega_0^0) = \sum_{j=0}^{4^i} (E_Q(\Omega_j^i) + E_{\tilde{R}}(\Omega_j^i)), \forall i$$

where E is the total energy of the factorized BTF. One of the properties of the wavelet decomposition is that this energy is constant regardless of the decomposition level i.

Consideration is now given to the normalized energy functions $\overline{E}_Q$ and $\overline{E}_{\tilde{R}}$.

These Functions are Such that:

$\overline{E}_Q(\Omega_0^0) = \overline{E}_{\tilde{R}}(\Omega_0^0) = 1$

For the factorized BTF function, the total normalized energy is obtained as follows:

$$\overline{E}(\Omega_0^0) = \frac{\sum_{j=0}^{4^i}(\overline{E}_Q(\Omega_j^i) + \overline{E}_{\tilde{R}}(\Omega_j^i))}{2} = 1, \forall i$$

The energy functions and the normalized energy functions make it possible for the entire representation of the material under consideration (polynomial approximation and geometrical approximation of the residue) to sort the subbands in order of size. The greater the energy of a subband, the greater the size of that subband.

A simplification criteria may be defined to determine the subbands that are to be retained using two approaches:

a qualitative approach; and a quantitative approach.

In the qualitative approach, a threshold $\tau$ is set such that $\overline{E}(\Omega_0^0) = \tau$, where $\tau \in ]0; 1]$. The subbands are conserved in order of increasing size up to the threshold $\tau$.

The threshold $\tau$ corresponds to the level of error that is introduced into the representation. For example, for $\tau = 0.5$, the representation is degraded twice as much as for $\tau = 1$ (no simplification), and for $\tau = 0.1$, the representation is ten times more degraded than for $\tau = 1$.

In the quantitative approach, a number N corresponding to the size of the representation is set. For example, if 10 megabytes (MB) are available in memory, then the subbands are conserved in order of decreasing size until the total size of the subbands that are retained is equal to 10 MB.

By considering the subbands one after another in order of decreasing size, simplification step E3 consists in retaining the subbands under consideration so long as the simplification criterion has not been reached.

The subbands that are "retained" are those that are of the greatest size in the representation, i.e. those that correspond to regions of the material that are the least uniform. Conversely, subbands that are not "retained" are those that correspond to regions of the material that are uniform, i.e. regions in which a pixel and its neighbors resemble one another the most.

During step E3, a presence map is also updated.

This presence map is a texture (dataset) comprising 0s or 1s depending on whether or not the subband is retained, i.e. depending on whether or not the subband is in the representation.

For example, at decomposition level 1, there are four subbands. The presence map is thus a texture of size 2×2=4 where a 0 (respectively a 1) determines whether the band is not "retained" (respectively is "retained").

At the end of step E3, for each viewpoint there is a presence map and a set of retained subbands defined by the wavelet coefficients.

The wavelet coefficients of the retained subbands serve to reconstitute the data from which they were obtained, i.e. the polynomial approximation of the per viewpoint BTF function, written $BTF_v$, and the geometric approximation of the corresponding residue.

This data corresponds to the representation for a given viewpoint of the material under consideration.

Step E3 of the method of the invention for representing a material is followed by an assembly step E4.

Steps E2 and E3 are performed for a given viewpoint, for the set of pixels (points) of the material, thus constituting a texture for the set of light directions.

Steps E2 and E3 are reproduced in the same manner for the set of viewpoints.

Assembly step E4 comprises grouping together all of the data for the set of viewpoints.

This data comprises the wavelet coefficients of the subbands that were retained during simplification step E3 together with the presence map.

At the end of assembly step E4, a representation is available for the material under consideration. This is a BTF function that it is appropriate to write as follows:

$\widetilde{BTF}(x, y, \theta_v, \phi_v, \theta_l, \phi_l)$ that is very close to the original BTF function (written:

$BTF(x, y, \theta_v, \phi_v, \theta_l, \phi_l)$)

and that is more compact than the original function.

The method of the invention for representing a material is described above for an implementation in which the original function is a BTF function. In a variant, the interaction between a light source and the material under consideration is modeled by an original SVBRDF function. The method is then identical, but with the BTF function being replaced by an SVBRDF function.

The invention also provides a method of rendering a material on graphics equipment.

FIG. 3 is a flow chart of a method of the invention for rendering a material.

Two types of rendering may be considered: "hardware" rendering on graphics equipment also known as graphical processor unit (GPU) rendering; and "software" rendering on conventional processors, also known as central processor unit (CPU) rendering.

GPU rendering possesses special properties. These properties involve complying with certain rules that make it difficult to transpose from a method designed for CPU rendering to GPU rendering. Conversely, a method designed for GPU rendering is transposable for CPU rendering.

One of the particular properties of GPU rendering is parallelism. This property implies that two processes are not executed sequentially, i.e. one after the other, but in parallel, i.e. both at the same time.

On present graphics processors, it is possible to perform up to 128 processes in parallel. The improvement in performance of GPU rendering compared with CPU rendering is thus theoretically 128.

It is also possible to achieve parallelism with CPU rendering, but with a much lower level of performance.

It is therefore advantageous to have recourse to GPU rendering than to CPU rendering, in particular for reasons of performance.

The method of the invention for representing a material is adapted to GPU rendering and to CPU rendering. For a given pixel, for a given viewpoint, and for a given light direction, it is possible to reconstruct the material corresponding to these values. Such a reconstruction may be performed in parallel for the pixels of the material.

A loading first step F1 serves to load into the video memory of graphics equipment the data coming from a method as described above for representing a material.

The loading step is performed once only, whereas the following steps of the rendering method are performed while displaying an image.

The loaded data is organized per viewpoint and for a given viewpoint it comprises a presence map and the wavelet coefficients of the subbands that have been retained.

Like the method of representing the material under consideration, which method is performed per viewpoint, the method of rendering the material is also performed per viewpoint, referred to as per rendering viewpoint and written $v_r$.

The above-described representation method uses a discrete number of viewpoints (81 in the implementation described). However, rendering may require viewpoints to be taken into consideration other than those that were used for representation.

During a second step F2, barycentric interpolation of the rendering viewpoint $v_r$ is performed.

For this purpose, in the set of viewpoints used for representation, the three viewpoints $(v_i, v_j, v_k)$ that are the closest to the rendering viewpoint $v_r$ are identified. To each of these three viewpoints is given a respective weight $(w_i, w_j, w_k)$ that is representative of its closeness.

The following step is a reconstruction step F3.

This step is performed separately for each of the three viewpoints $v_i, v_j, v_k$ as identified following barycentric interpolation of the rendering viewpoint $v_r$.

Once a viewpoint has been fixed, the reconstruction step serves to reconstitute a pixel corresponding to a light direction from the presence map and subbands available for this viewpoint.

The reconstruction of a pixel is performed by an inverse wavelet transform of the wavelet coefficients of the subbands retained during simplification step E3 of the representation method. The retained subbands are identified from the presence map whenever it contains a 1.

The reconstruction of a pixel relies on a property of decomposition into wavelet packets, namely the locality property. This locality property makes it possible, starting from the pixel under consideration, to determine the associated wavelet coefficients. Because of this property, there is no need to perform the inverse transform for all of the wavelet coefficients in order to reconstruct the texture, but only for those wavelet coefficients that are associated with the pixel that is to be reconstructed.

The reconstruction of a pixel comprises reconstituting the polynomial and the residue as obtained at the end of the factorization step E2 of the representation method.

The polynomial represents the set of light directions.

The residue represents only those light directions that are selected to define an approximation mesh. It is then necessary to perform interpolation in order to go from a residue defined for certain selected light directions to the set of light directions.

At the end of reconstruction step F3 performed for each of the three viewpoints $v_i$, $v_j$, and $v_k$, three BTF functions are obtained as follows:

$$BTF_{v_i}(x,y,\theta_l,\phi_l),$$

$$BTF_{v_j}(x,y,\theta_l,\phi_l),$$

$$BTF_{v_k}(x,y,\theta_l,\phi_l)$$

where:
- $v_i$, $v_j$, and $v_k$ are the three viewpoints identified during the barycentric interpolation step;
- $(x,y)$ are the coordinates of a pixel of an image and they correspond to the spatial coordinates of a point at the surface of the material; and
- $(\theta_l,\phi_l)$ are the polar coordinates of a light direction l.

These BTF functions may also be expressed as follows:

$$BTF_{v_i}(x,y,\theta_l,\phi_l) \approx B\tilde{T}F_{v_i}(x,y,\theta_l,\phi_l) = Q_{v_i}(x,y,\theta_l,\phi_l) + \tilde{R}_{v_i}(x,y,\theta_l,\phi_l),$$

$$BTF_{v_j}(x,y,\theta_l,\phi_l) \approx B\tilde{T}F_{v_j}(x,y,\theta_l,\phi_l) = Q_{v_j}(x,y,\theta_l,\phi_l) + \tilde{R}_{v_j}(x,y,\theta_l,\phi_l),$$

$$BTF_{v_k}(x,y,\theta_l,\phi_l) \approx B\tilde{T}F_{v_k}(x,y,\theta_l,\phi_l) = Q_{v_k}(x,y,\theta_l,\phi_l) + \tilde{R}_{v_k}(x,y,\theta_l,\phi_l),$$

where:
- $Q_{v_i}$, $Q_{v_j}$, $Q_{v_k}$ are the respective reconstituted polynomials for the three viewpoints $v_i$, $v_j$, and $v_k$; and
- $\tilde{R}_{v_i}$, $\tilde{R}_{v_j}$, and $\tilde{R}_{v_k}$ are the respective residues reconstituted for the three viewpoints $v_i$, $v_j$, and $v_k$.

For the rendering viewpoint $v_r$, the following applies:

$$BTF_{v_r} \approx B\tilde{T}F_{v_r} = w_i * B\tilde{T}F_{v_i} + w_j * B\tilde{T}F_{v_j} + w_k * B\tilde{T}F_{v_k}$$

It is possible to use different levels of detail to render the material under consideration. The level of detail that is used depends on the plane in which the article made up of said material is located in the virtual environment under consideration and for which the rendering is being performed.

The more the article lies in a plane close to the foreground of the virtual environment for which rendering is being performed, the greater the level of detail. Conversely, the more the article lies in a plane close to the background, the lower the level of detail.

Levels of detail are used to avoid any phenomenon of aliasing on the material as the article moves away from the foreground of the virtual environment.

The level of detail is calculated by functions that are associated with the graphics equipment used.

The level of detail determines the number of reconstructions that need to be performed.

Thus, for the coarsest level of detail, and for the pixel under consideration, only the approximation coefficients of the polynomial are reconstituted.

For intermediate levels of detail, the approximation coefficients and certain detail coefficients of the polynomial are reconstituted.

For the finest level of detail, all of the coefficients of the polynomial are reconstituted and the residue is also reconstituted.

Reconstruction step F3 takes account of the level of detail as described above.

Figure 4:
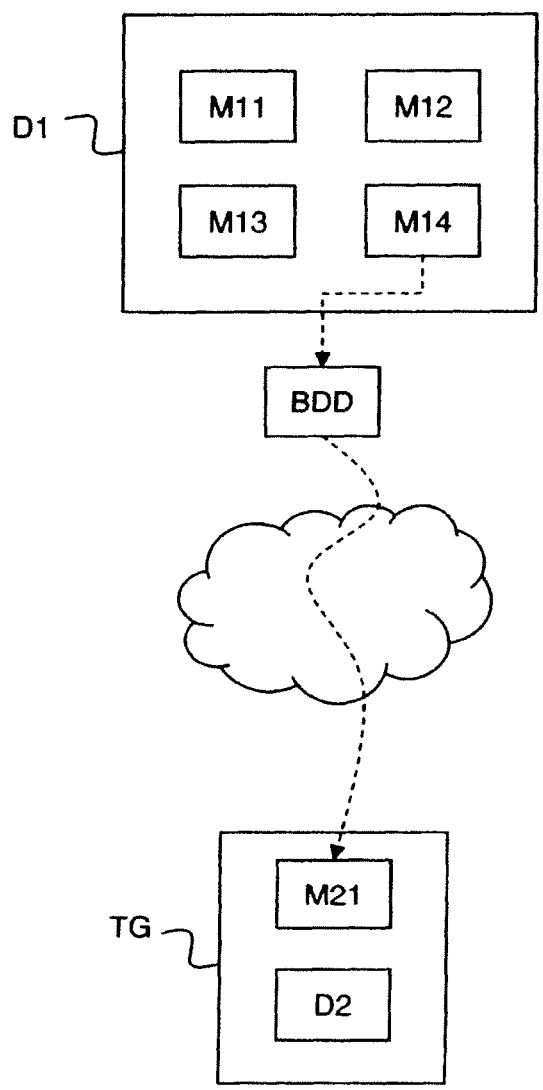
FIG. 4 shows a system implementing a method of representing and a method of rendering a material as shown respectively in FIGS. 1 and 3.

FIG. 4 shows a system implementing a method of the invention for representing a material and a method of the invention for rendering a material.

The system comprises a device D1 for rendering a material, as shown in FIG. 4.

The device D1 has a processor module M11 adapted to perform a per viewpoint separation of the data making up an original BTF function (or SVBRDF function) modeling the interaction between a light source and the material under consideration.

This module M11 also implements the step E1 of the above-described method of representing a material.

The device D1 includes a factorization module M12 that approximates the data from the module M11, in the manner described for step E2.

The device D1 also includes a simplification module M13 that applies a technique of decomposition into wavelet packets so as to reduce the quantity of data delivered by the module M12.

This module M13 thus implements the step E3 of the above-described method of representing a material.

The device D1 also includes an assembly module M14 that implements the above-described step E4. The assembly module M14 outputs the representation of the material under consideration.

The device D1 also includes a control central unit (not shown) that is connected to each of the modules M11 to M14 and that is adapted to control their operation.

The system also includes a database BDD in which it is possible to record the representation of the material as obtained at the output from the module M14.

The system also includes a graphics terminal TG that can consult the database BDD via a network RES.

The graphics terminal TG comprises a module M21 for loading the data stored in the database BDD.

The graphics terminal TG includes a device D2 for rendering material as shown in FIG. 4. The device D2 comprises reconstruction means for reconstituting a polynomial approximation of the original BTF function and reconstituting a geometric approximation of a residue resulting from the difference between the original BTF function and the polynomial approximation of said function.

The device D2 performs the steps F2 to F3 of the rendering method of the invention as described above.

The modules M11 to M14 of the device D1 may be software modules forming a computer program. The invention thus also provides a computer program for a device D1 for representing a material, the program comprising software instructions to cause the device to execute the above-described method of representing a material. The computer program may be stored in or transmitted via a data medium. The medium may be a storage hardware medium, e.g. a CD-ROM, a floppy, or a hard magnetic disk, or it may be a transmissible medium such as an electrical, optical, or radio signal.

The module M21 and the device D2 may be software modules forming a computer program.

The invention thus also provides a computer program for a module M21. The invention thus provides a computer program for a device D2 for rendering a material, the program comprising software instructions for causing the device to execute the above-described method of rendering a material. The computer program may be stored in or transmitted by a data medium. The medium may be a storage hardware medium, e.g. a CD-ROM, a floppy, or a hard magnetic disk, or it may be a transmissible medium, such as an electrical, optical, or radio signal.

The invention also provides a graphics terminal such as the terminal TG. The terminal may in particular be a computer or a games console.

The invention claimed is:

1. A representation method for representing a material of an article by approximating an original function modeling the interaction of the material and of light emitted by a light source, which function is defined as a function of pixels, of viewpoints, and of light directions, the method comprising:

for each viewpoint, performing, using a processor of a device, a first and a second approximation for each pixel and for a set of light directions, the first approximation being a polynomial approximation of the original modeling function and the second approximation being a geometric approximation of a residue resulting from the difference between the original modeling function and the polynomial approximation of said function; and performing a simplification by decomposing results obtained from the two approximations into wavelet packets.

2. The representation method according to claim 1, wherein the original modeling function is a BTF function or an SVBRDF function.

3. The representation method according to claim 1, wherein the polynomial approximation step of the original modeling function is performed from an original mesh resulting from a paraboloidal projection of a three-dimensional space into a two-dimensional space of median vectors obtained from a vector representative of the viewpoint direction and from vectors representative respectively of each of the light directions.

4. The representation method according to claim 1, wherein the step of geometrically approximating the residue is performed from an approximation mesh resulting from a paraboloidal projection of a three-dimensional space into a two-dimensional space of median vectors obtained from a vector representative of the viewpoint direction and from vectors representative respectively of directions selected from the light directions.

5. The representation method according to claim 1, wherein the step of simplification by decomposing the polynomial approximation of the original modeling function and the geometric approximation of the residue into wavelet packets includes obtaining subbands made up of approximation coefficients and of detail coefficients.

6. The representation method according to claim 5, wherein by applying a simplification criterion, subbands are selected from the subbands obtained and, when a subband is selected, a presence map is updated.

7. A non-transitory computer readable storage medium containing a computer program product comprising instructions for executing the steps of the method representing a material of an article by approximating an original function modeling the interaction of the material and of light emitted by a light source, which function is defined as a function of pixels, of viewpoints, and of light directions, according to claim 1 when the program is executed on a computer.

8. A method of rendering a representation of a material of an article obtained by approximating an original function modeling the interaction of the material and of light emitted by a light source, which function is defined as a function of pixels, of viewpoints, and of light directions, the method being performed by a computer system and comprising:
a reconstruction step comprising reconstituting a first and a second approximation for each pixel and for a set of light directions, the first approximation being a polynomial approximation of the original modeling function and the second approximation being a geometric approximation of a residue resulting from the difference between the original modeling function and the polynomial approximation of said function.

9. A non-transitory computer readable storage medium containing a computer program product comprising instructions for executing the steps of the method of rendering a representation of a material of an article obtained by approximating an original function modeling the interaction of the material and of light emitted by a light source, which function is defined as a function of pixels, of viewpoints, and of light directions, according to claim 8 when the program is executed on a computer.

10. A device for representing a material of an article by approximating an original function modeling the interaction of the material and of light emitted by a light source, which function is defined as a function of pixels, of viewpoints, and of light directions, the device including a processor and comprising:
a factorization module for performing, for each viewpoint, a first and a second approximation for each pixel and for a set of light directions, the first approximation being a polynomial approximation of the original modeling function and the second approximation being a geometric approximation of a residue resulting from the difference between the original modeling function and the polynomial approximation of said function; and
a simplification module for simplifying results obtained at the output from the factorization module.

11. A rendering device for rendering a representation of a material of an article obtained by approximating an original function modeling the interaction of the material and of light emitted by a light source, which function is defined as a function of pixels, of viewpoints, and of light directions, the device including a processor and comprising:
a reconstructor for reconstituting a first and a second approximation for each pixel and for a set of light directions, the first approximation being a polynomial approximation of the original modeling function and the second approximation being a geometric approximation of a residue resulting from the difference between the original modeling function and the polynomial approximation of said function.

12. A graphics terminal comprising the rendering device according to claim 11.

* * * * *